April 16, 1968 P. S. SWARTZ 3,378,691

SUPERCONDUCTIVE SHIELD

Filed Sept. 26, 1963

Inventor:
Paul S. Swartz,
by Paul R. Webb, II
His Attorney.

3,378,691

SUPERCONDUCTIVE SHIELD

Paul S. Swartz, Schenectady, N.Y., assignor to General Electric Company, a corporation of New York Filed Sept. 26, 1963, Ser. No. 311,714
2 Claims. (Cl. 307—91)

This invention relates to superconductive shields and to methods of forming superconductive shields and more particularly to high magnetic field strength superconductive shields and methods of forming such shields.

While the existence of superconductivity in many metals, metal alloys and metal compounds has been known for many years, the phenomenon has more or less been treated as a scientific curiosity until comparatively recent times. The awakened interest in superconductivity may be attributed, at least in part, to technological advances in the arts where their properties would be extremely advantageous in generators, direct current motors and low frequency transformers, and to advances in cryogenics which remove many of the economic and scientific problems involved in extremely low temperature operations.

As is well known, superconduction is a term describing the type of electrical current conduction existing in certain materials cooled below a critical temperature, $T_c$, where resistance to the flow of current is essentially non-existent. The existence of conventional high magnetic field strength devices and the development of high magnetic field strength superconductive devices has posed a problem of shielding the resulting high magnetic field strength of such devices from the surrounding area, wherein, for example, the control instrumentation is located for the particular device. Such instrumentation is affected adversely by the high magnetic field strength.

Space flight, which includes either instrumentation or personnel or both instrumentation and personnel, poses similar shielding problems. It would be desirable to shield the instrumentation from high magnetic field intensities. It would also be advantageous to provide a high magnetic field strength within the capsule excluding the instrumentation in which a person was orbited to prevent the effects of radiation from affecting the person. Thus, if both personnel and instrumentation are positioned within a capsule, it is desirable to provide a high magnetic field strength area around the person and to shield this area from a low magnetic field strength outside the capsule during orbit of the capsule. It is also desirable to shield the low energy magnetic field strength area surrounding the instrumentation from the high energy magnetic field strength area surrounding the person within the capsule.

Such shielding poses further problems in that the shield must shield the total drop in magnetic field strength between the confined area and the excluded area. Furthermore, the weight of the shield must be as low as possible to be advantageously employed in a capsule which will be orbited by a rocket or other launch vehicle.

The present application is directed to a high magnetic field strength superconductive shield and to methods of making such a shield, wherein a high magnetic field strength area is confined therein and excluded from the surrounding low or zero magnetic field strength area. The present application is also directed to a high magnetic field strength superconductive shield and to methods of making such a shield wherein a low or zero magnetic field strength is confined therein and excluded from the surrounding high magnetic field strength area. The high magnetic field strength superconductive shield of the present invention is shown as a wall structure surrounding an instrumentation chamber and as the side wall structure in a space capsule to be launched by a rocket or other launch vehicle.

It is an object of my invention to provide a high magnetic field strength superconductive shield to separate a high magnetic field strength from a low magnetic field strength.

It is another object of my invention to provide a high magnetic field strength superconductive shield to separate a low magnetic field strength from a high magnetic field strength.

It is a further object of my invention to provide a method of confining a high magnetic field strength.

It is still a further object of my invention to provide a method of confining a low magnetic field strength.

In carrying out my invention in one form, a high magnetic field strength superconductive shield comprises a plurality of concentric superconductive members, and means to cool sequentially each of said members below its critical temperature.

These and various other objects, features and advantages will be better understood from the following description taken in connection with the accomyanying drawing in which.

Figure 1:
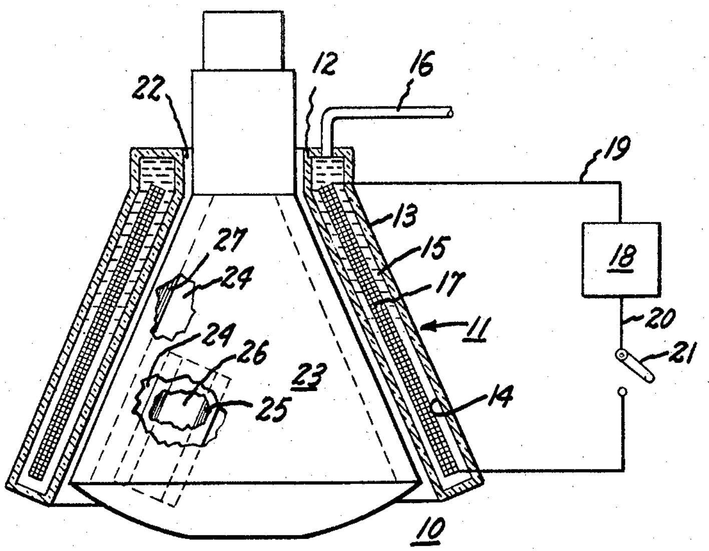
FIGURE 1 is a sectional view through apparatus designed to produce a high magnetic field strength.

In FIGURE 1 of the drawing, apparatus is shown generally at 10 for producing a high magnetic field strength. Apparatus 10 comprises a container 11 in the form of a hollow insulated shell with an inner wall 12 and an outer wall 13 defining a chamber 14 filled with liquid helium 15 and provided with an inlet line 16 to supply helium to chamber 14. Side walls 13 and 14 of container 11 are constructed of a material for containing liquid helium. A solenoid 17 of superconducting material is positioned within chamber 14 and in liquid helium 15. Solenoid 17 is energized from power source 18 which is connected thereto by means of leads 19 and 20. A switch 21 is provided in lead 20 between the solenoid 17 and power source 18 to energize and de-energize solenoid 17.

Container 11 has a central hollow portion or chamber 22 in which there is shown a space capsule 23 of any desired configuration. Container 11 is positioned around capsule 23 and removed therefrom by any suitable means (not shown) such as a crane. Capsule 23 had a chamber 24 in which a first high magnetic field strength shield 25 is positioned. Shield 25 surrounds a chamber 26 in which instrumentation (not shown) is positioned. A second high magnetic field strength shield 27 comprises the side wall structure of capsule 23.

One possible solution to providing a shield between a high magnetic energy field area and low magnetic energy field area might be the employment of a hollow superconductive shield between the areas. Such a shield should shield the drop in magnetic field strength between the areas. However, I found that such a shield structure would not shield the drop between the separated areas.

I discovered, however, that a superconductive shield would shield the drop in the magnetic field strength between the above areas if the shield comprised a plurality of concentric hollow superconductive members which became superconducting in sequence. Thus, a plurality of these members forming a shield would shield a total drop in the magnetic field strength while a unitary shield of the same thickness would not shield such a drop.

Figures 2, 3:
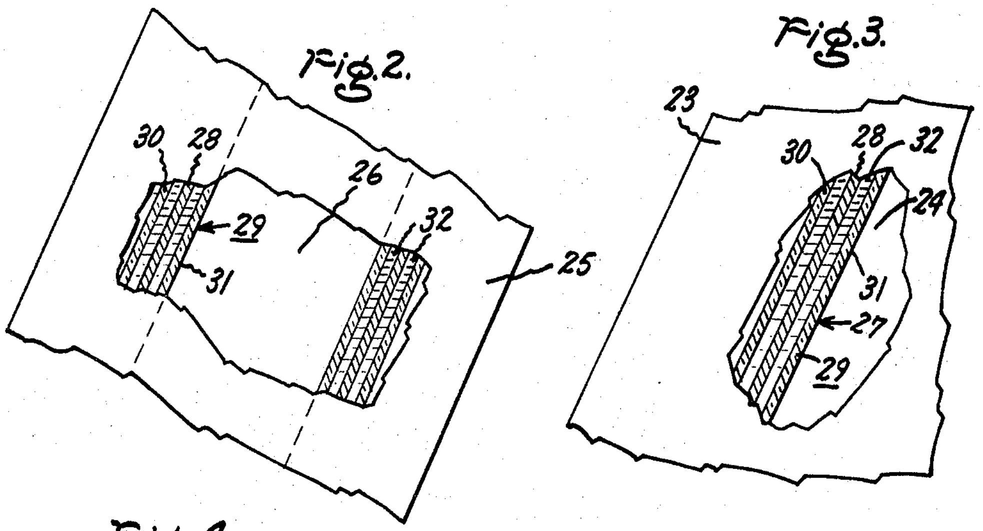
FIGURE 2 is a sectional view of a portion of a high magnetic field strength superconductive shield positioned within the space capsule as shown in FIGURE 1.
FIGURE 3 is a sectional view of a portion of a high magnetic field strength superconductive shield shown as the side wall structure in FIGURE 1.

In FIGURE 2 of the drawing, there is shown a portion of shield 25 disclosing the innermost superconductive member 28 therein. Shield 25 has a plurality of concentric members 28 of a high field superconductive material, such as, niobium-tin, $Nb_3Sn$. A container 29, which includes a pair of side walls 30 and 31, is filled with liquid helium 32. Each member 28 is shown positioned in an individual container 29, which is spaced apart from adjacent containers 29. These containers can also be positioned together with walls 30 and 31 of two adjacent containers in contact. Individual containers 29 are connected to and filled from a source of liquid helium (not shown) which is, for example, located outside of capsule 23. Shield 25 defines a chamber 26 in which instrumentation is positioned and separates chamber 26 from larger chamber 24 within capsule 23. Thus, shield 25 comprises a plurality of concentric superconductive members 28, positioned in individual containers 29 filled with liquid helium 32 to cool each of members 28 below its critical temperature.

In the operation of shield 25 disclosed in FIGURES 1 and 2 of the drawing for confining a low or zero magnetic field strength in chamber 26 defined by shield 25, space capsule 23 with shield 25 therein is positioned within chamber 22 of container 11 in apparatus 10 in FIGURE 1. Chamber 14 of container 11 is filled with liquid helium 15 through inlet line 16. Container 29 surrounding the innermost member 28 of shield 25 is filled with liquid helium from a source (not shown) outside of capsule 23. Switch 21 is closed activating power source 18 and energizing solenoid 17 to provide a magnetic field strength of 10,000 oersteds. Member 28 in innermost container 29 of shield 25 which is superconducting supports then a drop in magnetic field strength of 10,000 oersteds. While only one member 28 is shown in FIGURE 2 of the drawing, shield 25 has a plurality, for example, of ten concentric superconductive members 28 to confine a low or zero magnetic field strength within chamber 26 defined by shield 25 and excluding a high magnetic field strength therefrom. Each superconductive member 28 will support a drop in magnetic field strength of 10,000 oersteds whereby shield 25 supports or shields a total drop in magnetic field strength of 100,000 oersteds.

The next innermost chamber 29 of shield 25 is filled with liquid helium in the same manner. The magnetic field strength of solenoid 17 is increased to 20,000 oersteds. The second innermost member 28 of shield 25 will then support a drop in magnetic field strength of 10,000 oersteds. In this manner, two members 28 of shield 25, each supporting a drop in magnetic field strength of 10,000 oersteds, support then a sub-total drop in magnetic field strength of 20,000 oersteds. Solenoid 17 is increased by 10,000 oersteds in each of eight additional steps after each subsequent container 29 is filled with liquid helium. The total magnetic field strength at 100,000 oersteds is shielded by the ten members 28 each supporting or shielding a drop in magnetic field strength of 10,000 oersteds. Thus, shield 25 shields a total drop in magnetic field strength of 100,000 oersteds. It will be seen that instrumentation (not shown), which is positioned within chamber 26, is protected from a high magnetic field strength region outside of shield 25.

In FIGURE 3 of the drawing, there is shown a portion of shield 27 disclosing the innermost superconductive member 28 thereof. Shield 27 has a plurality of concentric superconductive members 28 which shield comprises the side wall of capsule 23. A container 29, which includes a pair of side walls 30 and 31, is filled with liquid helium 32. Each member 28 is shown positioned in an individual container 29, which is spaced apart from adjacent container 29. As it was described above, these containers can also be positioned together with walls 30 and 31 of two adjacent containers in contact. Individual containers 29 are connected to and filled from a source of liquid helium (not shown) which is, for example, located outside of capsule 23. Shield 27 defines a chamber 24 in which is positioned shield 25. Chamber 24 is employed, for example, for positioning a person in capsule 23. Thus, shield 27 comprises a plurality of concentric hollow superconductive members 28, positioned in individual containers 29 filled with liquid helium 32 to cool each of members 28 below its critical temperature.

As it was described above, chamber 24 of space capsule 23 has a high magnetic field strength of 100,000 oersteds which is shielded from chamber 26 by shield 25 which supports or shields a total magnetic field strength of 100,000 oersteds. In the operation of shield 27 in FIGURE 3, container 29 surrounding innermost member 28 of shield 27 is filed with liquid helium from a source (not shown) outside capsule 23 whereupon this member 28 becomes superconducting and supports a drop in magnetic field strength of 10,000 oersteds. The magnetic field strength of solenoid 17 is then reduced to 90,000 oersteds whereupon a total magnetic field strength of 100,000 oersteds is present. Container 29 of the second innermost member 28 is then filled with liquid helium whereupon this member 28 becomes superconducting and supports a drop in magnetic field strength of 10,000 oersteds. The magnetic field strength of solenoid 17 is then reduced to 80,000 oersteds thereby maintaining the total magnetic field strength at 100,000 oersteds within chamber 24. While only one member 28 is shown in FIGURE 3 of the drawing, shield 27 has a plurality, for example, ten concentric superconductive members 28 to confine a high magnetic field strength within chamber 24 between shields 25 and 27 and excluding a low or zero magnetic field strength therefrom.

Each adjacent container 29 is filled with liquid helium thereby causing the superconductive member 28 positioned therein to become superconducting and to support an additional drop in magnetic field strength of 10,000 oersteds. After each chamber is filled proceeding outwardly from the innermost container to the outermost container, the solenoid 17 is decreased in magnetic field strength by an additional 10,000 oersteds. After the ten superconducting members 28 have become superconducting, shield 27 supports or shields a total drop in magnetic field strength of 100,000 oersteds. Switch 21 is then opened and the magnetic field strength of solenoid 17 is terminated.

Thus, chamber 24 has confined therein a high magnetic field strength of 100,000 oersteds to prevent the effects of radiation from effecting a person positioned in this chamber. Capsule 23 may then be removed from chamber 22 of container 11 by lifting off container 11 by a crane. The capsule is employed subsequently with a rocket or other launching vehicle for space flight of the capsule. Thus, capsule 23 has a low or zero magnetic field strength confined in chamber 26 by shield 25 and a high magnetic field strength confined in chamber 24 between shields 25 and 27.

Figure 4:
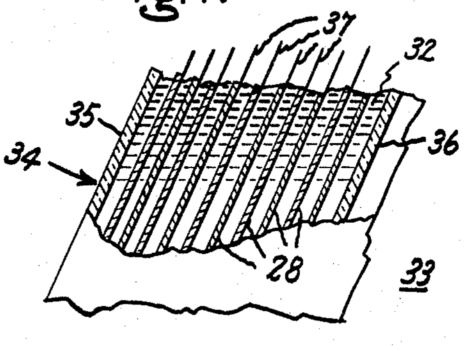
FIGURE 4 is a sectional view of a portion of a modified high magnetic field strength superconductive shield.

In FIGURE 4 of the drawing, there is shown a portion of a modified high magnetic field strength superconductive shield 33 which has a plurality of concentric superconductive members 28. A single container 34, which includes a pair of side walls 35 and 36 is filled with liquid helium 32 to cool each of the members 28 below its critical temperature. An electrical conductor 37 in the form of a wire, for example of 80 weight percent nickel, and 20 weight percent chromium alloy is affixed by brazing to each member 28 with the exception of the innermost member. Wire 37 is continuous with either the exterior or inner surface of member 28 from its upper edge to its lower edge. These wires are connected to a power source (not shown) which is outside the shield and detachable therefrom.

In the operation of the shield disclosed in FIGURE 4 of the drawing, shield 33 is for example, substituted for shield 25 shown in FIGURES 1 and 2 of the drawing. The operation of shield 33 is generally similar to the operation of shield 25 with the following exceptions. Container 34 is initially filled with liquid helium 32. Each of members 28 is below its critical temperature after helium is poured into container 34. Prior to energizing solenoid 18, or prior to filling container 11 with helium 15, the power source (not shown) for conductors 37 is activated and current is supplied to conductors 37. The current is controlled to raise the temperature of the portion of each member 28 adjacent its associated conductors to a temperature in excess of the critical temperature of member 28. It is also necessary that each conductor 37 be controlled separately to terminate this current as will be more fully described below.

With shield 33 in space capsule 23, capsule 23 is positioned in chamber 22 of container 11 as shown in FIGURE 1. Chamber 14 of container 11 is filled with liquid helium 15 through inlet line 16. Switch 21 is closed activating power source 19 and energizing solenoid 17 to provide a magnetic field strength of 10,000 oersteds. Innermost member 28 in container 34 of shield 33 which is superconducting supports then a drop in magnetic field strength of 10,000 oersteds. In FIGURE 4 of the drawing, shield 33 has a plurality, for example, ten concentric superconducting members 28 to confine low or high magnetic field strength within chamber 26 defined by shield 33 and excluding a high magnetic field strength therefrom. Each superconductive member 28 will support a drop in magnetic field strength of 10,000 oersteds whereby shield 33 supports or shields a total drop in the magnetic field strength of 10,000 oersteds.

The next innermost member 28 of the remaining plurality of members, each of which has a conductor 37 affixed thereto from its upper edge to its lower edge, has current supplied thereto. The portion of member 28 adjacent conductor 37 is at a temperature above the critical temperature of the member. Thus, this member and the other members 28 having heat supplied thereto from the current in conductor 37 are non-superconducting although these members 29 are positioned in liquid helium. The current in conductor 37 of the second innermost member 28 is then terminated. The magnetic field strength of solenoid 17 is then increased to 20,000 oersteds. The second innermost member 28 of shield 34 will then support a drop in magnetic field strength of 10,000 oersteds. In this manner, these two members 28, each supporting a drop in magnetic field strength of 10,000 oersteds, support then a sub-total drop in magnetic field strength of 20,000 oersteds.

Solenoid 17 is increased by 10,000 oersteds in each of eight additional steps after the current in each conductor 37 is terminated for each of these members in sequence. The total magnetic field strength of 100,000 oersteds is shielded by the ten members 28 each supporting or shielding a drop in magnetic field strength of 10,000 oersteds. Thus, shield 33 shields a total drop in magnetic field strength of 100,000 oersteds. It will be seen that instrumentation (not shown), which is positioned within chamber 26, is protected from a high magnetic field strength region outside of shield 33.

While other modifications of this invention and variations of the method which may be employed within the scope of the invention have not been described, the invention is intended to include such that may be embraced within the following claims.

What I claim as new and desire to secure by Letters Patent of the United States is:

1. A method of shielding a first low magnetic field strength region from a second high magnetic field strength region which comprises providing a plurality of concentric superconductive members surrounding said first region, cooling said first superconductive member adjacent to and immediately surrounding said first region below its critical temperature thereby causing said first member to become superconducting, providing an initial predetermined low magnetic field strength thereby causing said first member to support a predetermined drop in magnetic field strength, cooling separately below its critical temperature each of the other superconductive members in sequence from said first superconductive member, and increasing the initial predetermined low magnetic field strength after the cooling of each subsequent member thereby causing each of the other members to support a predetermined drop in magnetic field strength.

2. A method of shielding a first high magnetic field strength region from a second low magnetic field strength region which comprises providing a plurality of concentric superconductive members surrounding said first region, providing an initial high magnetic field strength, cooling said first superconductive member adjacent to and immediately surrounding said first region below its critical temperature thereby causing said first member to become superconducting, decreasing the initial magnetic field strength by an amount supportable by said first member thereby causing said first member to support such a drop in magnetic field strength, cooling separately below its critical temperature each of the other superconductive members in sequence from said first superconductive member, and decreasing the magnetic field strength after the cooling of each subsequent member by an intensity equal to the drop in magnetic field strength supportable by each of said members.

References Cited

UNITED STATES PATENTS

| | | | |
|---|---|---|---|
| 3,098,181 | 7/1963 | Cioffi | 317—201 X |
| 3,185,900 | 5/1965 | Jaccarino et al. | 317—158 |
| 3,228,011 | 1/1966 | Crane | 340—173.1 |

MILTON O. HIRSHFIELD, *Primary Examiner.*

J. J. SWARTZ, D. F. DUGGAN, *Assistant Examiners.*